Patented May 27, 1947

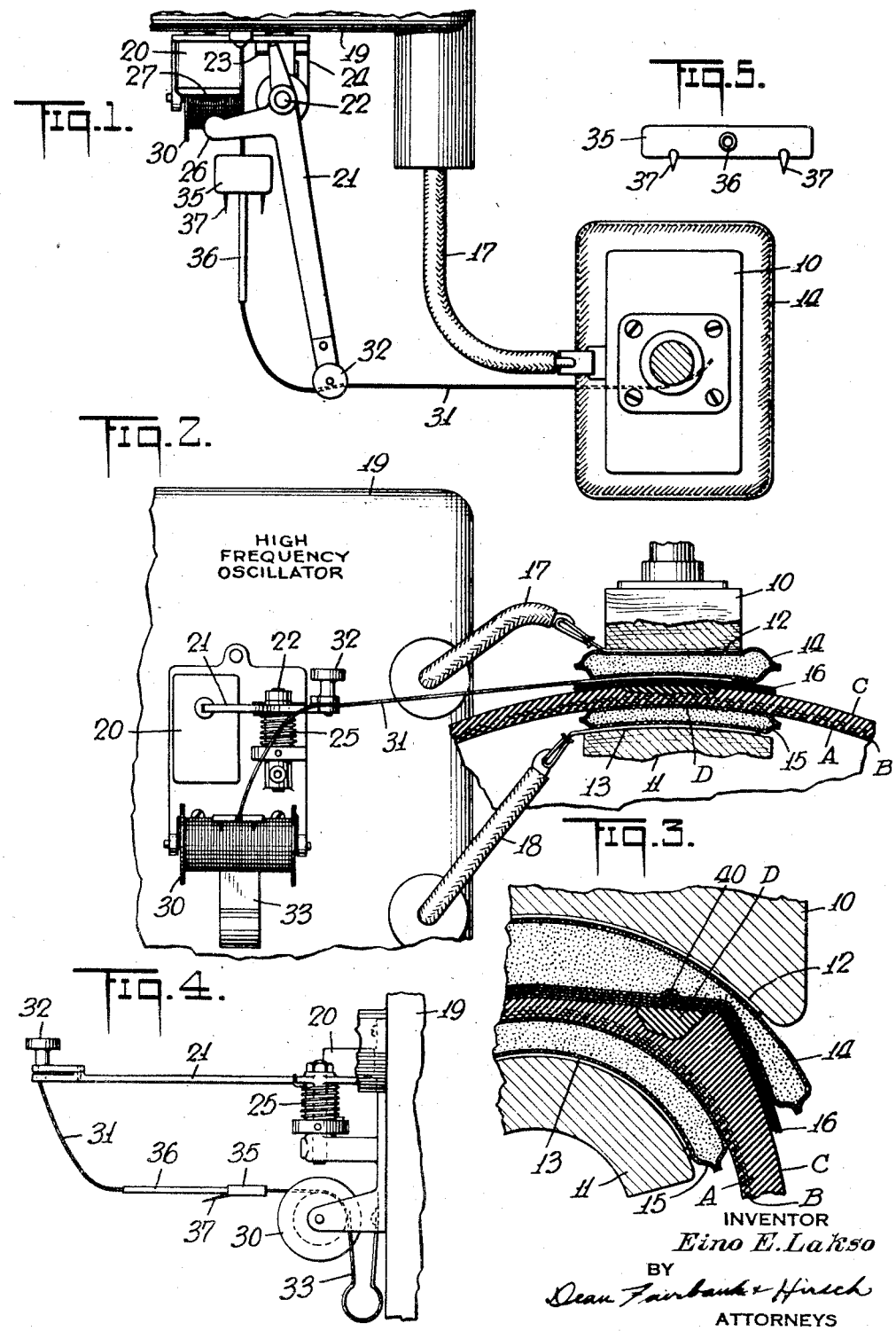

2,421,101

UNITED STATES PATENT OFFICE 2,421,101

APPARATUS AND METHOD FOR REPAIR OF TIRES

Eino E. Lakso, Fitchburg, Mass., assignor to Clarence W. Vogt, Norwalk, Conn.

Application May 18, 1944, Serial No. 536,068

11 Claims. (Cl. 18—18)

This invention relates to the repair of pneumatic tires by the action of a high frequency electrostatic field, and relates more particularly to the heating effect in said field, and which causes the vulcanization of the uncured rubber applied in the area to be repaired.

In my prior application Serial No. 507,940, I have illustrated an apparatus for tire repair which includes a pair of electrodes disposed on opposite sides of the wall portion to be repaired, and connected to a suitable source of high frequency current, to produce an electrostatic field. The electrodes are shown as spaced from the tire by deformable pads of suitable dielectric material such as sand.

In the prior application Serial No. 514,542, filed December 16, 1943, by Clarence W. Vogt and myself, there is shown means for automatically breaking an electric circuit when the temperature adjacent to the surface of the tire wall has been raised to that required for the desired vulcanization.

The present invention is an improvement on the apparatus shown in said applications, and involves a new method of effecting the temperature control.

One object of the present invention is to secure a more uniform distribution of the heating effect, and particularly in the area where the repair is to be effected and the applied rubber is to be vulcanized. In the ordinary tire there are incorporated a plurality of layers of fabric, such as cords, adjacent to the inner surface. This fabric is also fairly close to the outer surface in the areas of the side walls and beads, but along the tread portion there is a considerable thickness of rubber outside of said fabric. The dielectric constant of the fabric and the rubber are not the same, and there is a tendency for the fabric to become heated more rapidly, or to a higher temperature, than the outer rubber layer.

In carrying out my present invention, I apply to the outer surface of the tire, and between the tire and the outer electrode, a material having substantially the same dielectric constant as the fabric of the tire, so that the rubber to be vulcanized is disposed between two layers of material which have about the same dielectric constant, and thus the rubber throughout the area between said layers may be heated substantially uniformly.

A further object of the invention is to provide an improved means for breaking the circuit producing the heating effect when the desired temperature is reached.

In carrying out my invention there is employed a strand or thread of a material which has high tensile strength at atmospheric temperature, but low tensile strength at the temperature to which the rubber is heated to effect vulcanization. One end of the strand is clamped between the tire and one electrode, and the other end is held under tension, which when released by the breaking of the strand, will cause the breaking of the electric circuit. The strand may be of various different materials having the desired characteristics, but a thread of vinylidine chloride polymer, sold under the trade-name "Saran" has been found very satisfactory.

As a further feature I provide a tube through which the strand may extend, and which may be detachably secured to the tire to hold the strand in place during the application of the pads and electrodes, and the application of pressure. After the clamping, the tube may be pulled out along the strand to leave the inner end tightly clamped and the outer portion in the groove remaining after pulling out the tube. Thus the tension may be applied to the inner clamped end, and with comparatively little clamping effect on the remaining portion between the electrodes, so that this outer portion may readily pull out when the heating adjacent to the clamped part of the strand is sufficient to cause the reduction of tensile strength to the point where the strand breaks under the tension applied.

In the accompanying drawings:

Fig. 1 is a top plan view of a portion of the apparatus, including the upper electrode and pad.

Fig. 2 is a side elevation of the apparatus shown in Fig. 1, with a wall of a tire in place between the electrodes.

Fig. 3 is a section similar to Fig. 2, but showing a portion of the tire adjacent to the tread in position between the electrodes, said section being taken at right angles to the direction of the strand.

Fig. 4 is a side elevation of certain of the parts shown in Fig. 2, and

Fig. 5 is an end view of the strand retaining member detached from the rest of the apparatus, and shown on a larger scale.

In the apparatus as illustrated, a tire wall A is clamped between two electrode carriers 10 and 11 having electrodes 12 and 13 carried thereby. Between the outer electrode 12 and the outer surface of the tire there is provided a bag 14 which may be formed of canvas and filled with a granular or pulverulent dielectric material, such as sand, or analogous material such as mineral or glass wool. Between the inner electrode 13 and the inner surface of the tire wall there is disposed a similar bag 15.

The tire wall A is shown as having a plurality of layers of cord or other fabric B adjacent to its inner surface embedded in rubber and a layer of rubber C, the major portion of which is outside of the layers of fabric, but which is integral with the rubber dispersed throughout the fabric, so as to form an integral wall.

In carrying out my invention I place to the outer surface of the tire over the area to be vulcanized, a plurality of layers 16 of fabric, the number of layers and the character of the fabric approximating the layers B of fabric within and adjacent to the inner surface of the tire except that it is not impregnated with or embedded in rubber. Therefore, as high frequency current is delivered to the electrodes 12 and 13 to form a high frequency electrostatic field between said electrodes, the outer applied fabric 16 will be heated to substantially the same temperature as the inner layers of fabric B of the tire, and to a somewhat higher temperature than the layer C of rubber, but the rubber to be vulcanized being spaced from each electrode by the same general character of pad, and by substantially the same general character of fabric layers, will be heated uniformly, and the temperature at the outer surface of the area to be vulcanized will be substantially the same as that at the innermost portion of the recess which was filled with the uncured rubber.

Obviously the size, area and depth of the area to be vulcanized will vary with the character of the repair. I have shown in Fig. 2 an area D of unvulcanized rubber which has been applied in making the repair.

In Fig. 3 I have shown substantially the same construction as in Fig 2, but taken transversely of the tire rather than circumferentially along a wall thereof, and have shown a part of the tread with the repair area D near the shoulder of the tread. This view shows more clearly the variation in the thickness of the rubber portion of the tire and the outer layers 16 following the contour of the outer surface of the tire. It also shows more clearly how the outer canvas bag 14 may conform to the surface of the tire and permit the use of an electrode 12 of standard curvature to apply to a wide variety of sizes and shapes of tires.

The electrodes may be connected by cables 17 and 18 to the terminals of a suitable apparatus 19, including a high frequency oscillator for producing the desired current. This apparatus 19 may be a portable unit and receive alternating current from any desired source. The supply of current to the electrodes is controlled by a switch 20 which may be mounted on the side of the apparatus 19. The switch may be operated by a bell crank lever 21 pivoted on a pin 22 and having stops 23 and 24 for limiting the extent of its movement. A coil spring 25 encircles the pivot pin 22 and normally tends to swing the lever 21 clockwise from the position shown in Fig. 1 to force the short arm 26 of the lever against the button 27 for operating the switch to break the circuit. A spool 30 carrying a strand 31 of a material such as Saran, having high tensile strength at atmospheric temperature is mounted on the side of the casing 19, and one end of the strand laid across the outer surface of the fabric layer 16 and clamped in place by the bag 14 and outer electrode.

When it is desired to start the vulcanizing action the lever 21 is swung counterclockwise to the position shown in Fig. 1, and the strand is clamped to the outer end of this lever by a clamping screw 32. Thus the spring 25 tends to swing the lever clockwise, and puts the portion of the strand between the end of the lever and the tire under tension. Obviously the degree of tension may be varied by adjusting the spring. A spring 33 may act on the spool to prevent unwinding of the latter when the apparatus is not in use.

If the portion of the strand between the fabric layers 16 and the outer bag 14 be clamped as tightly at the outer line of contact of the bag and fabric as it is over the area D to be vulcanized, the portion of the strand directly adjacent to said area may be heated to a higher temperature than that at the edge of the clamping area, and the strand will not give way until it has been heated to reduce its tensile strength to the breaking point at the outer edge of the clamped area. Furthermore, in assembling the parts and adjusting them preparatory to vulcanizing, the strand may be displaced laterally, or not accurately placed in respect to the area to be vulcanized. Therefore there is provided a positioning member which also serves to insure the clamping of the strand over the area D to be vulcanized more tightly than the portion adjacent to the edge of the clamping area. This positioning member is shown as a metal block 35 having a tube 36 extending therethrough and having pins 37 extending at an angle to one surface of the block 35. The strand may be threaded through the tube so that when the apparatus is not in use, or during actual vulcanizing the tube and block may be disposed on the strand between the spool 30 and the clamp 32, as shown in Figs. 1 and 4.

When a repair is to be made, and after the uncured rubber has been applied to the tire, the block 35 is placed on the surface of the tire and pushed along the surface so that the pins 37 extend into the rubber at a small angle to the surface of the latter, and the tube 36 extends to a point closely adjacent to the edge of the area D of the unvulcanized rubber. The strand is extended beyond the end of the tube and across said area. After the electrodes have been tightly clamped in position, with the tube between the outer bag 14 and the fabric layers 16, and the strand clamped to the lever 21 with the strand under tension, the tube is pulled out and placed near the spool. In pulling out the tube a small groove 40 will be left along the inner surface of the bag 14, and in which the strand will be only loosely clamped. Beyond the end of this groove, which would be beyond the initial position of the tube 36, the strand will be tightly clamped. Thus when the strand becomes heated to the breaking point in the area directly above the rubber being vulcanized, the portion of the strand between that area and the spring pressed lever 21 may pull out, regardless of the temperature of the strand at the outer edge of the pressure area between the electrodes. Thus the strand will break when the proper temperature has been reached at the area D, and regardless of the temperature at any other point along the length of the strand.

The swinging of the lever 21 under the action of the spring 25, upon the breaking of the strand, may be noted by the operator, who may then open the circuit to the electrodes and stop further vulcanization. Thus in some cases it is not necessary to open the switch 21 by the action of said lever automatically upon the breaking of the strand.

The strand stretches but little under the tension applied, and may elongate somewhat while the temperature is being raised. The tensile strength drops very rapidly in a comparatively close high temperature range, and the strand may greatly elongate before breaking. This range is approximately the temperature of the rubber at the time the vulcanization has been substantially completed and the rubber has acquired the desired condition as to hardness, toughness and resiliency. The breaking point of the strand may be varied by varying the composition or the cross-section thereof and the tension of the spring 25.

The member for holding the strand in place during the assembly of the apparatus parts preparatory to vulcanizing is shown as having a tube adapted to be placed with one end adjacent to the edge of the area to be vulcanized. Obviously this tube may be of various other cross-sectional forms than that shown, and may be an elongated member in the form of a channel of semicircular or other shape open along the side toward the tire wall.

It will be understood that the inner electrode carrier 11 may be held on any suitable support, and the upper or outer electrode carrier may be adjustable toward and from the inner one to permit the tire wall to be placed in position, and to force the outer carrier and electrode downwardly to clamp the part of the tire wall to be repaired, under the desired pressure, as shown in my prior application Serial No. 528,396.

The rubber to be vulcanized in the area to be repaired, as well as the rubber of the tire itself, may be natural rubber, synthetic rubber, or any other compound suitable for tire construction or repair. Therefore by the term "rubber" as used herein, I include any form of rubber or suitable rubber substitutes. I also use the terms "uncured" and "vulcanize" in a broad sense, to include the soft plastic repair material and the action which takes place by heat and pressure to convert it into a resilient form analogous to that of the rubber of the tire.

The term "fabric" is used to mean those substantially non-stretchable, non-metallic elements commonly used in tires, and regardless of whether they be woven or used as separate, generally parallel cords.

In the construction illustrated the two electrodes are on opposite sides of the tire wall, and are also oppositely disposed in respect to the area to be vulcanized. For the purposes of this invention, and so far as concerns certain aspects of it, the two electrodes may be oppositely disposed in respect to the area to be vulcanized, although both on the same side of the tire wall, for instance as shown in companion application Serial No. 514,542, hereinbefore referred to. As the use of a deformable pad between an electrode and the tire wall is not in itself a novel feature of the present invention, it will be evident that if desired such pad may be omitted from some embodiments of the present invention.

Having thus described my invention, what I claim as new and desire to secure by Letters Patent is:

1. The method of repairing a tire by vulcanizing uncured rubber at the area of the tire wall to be repaired, said wall having layers of fabric therein adjacent to the inner surface and a thicker layer of rubber substantially free of fabric at the outer surface, said method including applying uncured rubber to the tire section to be repaired, applying to the outer surface of the tire at said repair section a layer of material having substantially the same dielectric constant as the fabric incorporated in the inner portion of the tire wall, and producing a high frequency electrostatic field including said fabric and said material.

2. The method of repairing a tire by vulcanizing uncured rubber at the area of the tire wall to be repaired, said wall having layers of fabric therein adjacent to the inner surface and a thicker layer of rubber substantially free of fabric at the outer surface, said method including applying uncured rubber to the tire section to be repaired, applying to the outer surface of the tire at said repaired section a layer of material having substantially the same dielectric constant as the fabric incorporated in the inner portion of the tire wall, clamping the tire wall and said material between a pair of electrodes, and producing a high frequency electrostatic field between said electrodes.

3. The method of repairing a tire by vulcanizing uncured rubber at the area of the tire wall to be repaired, said wall having layers of fabric therein adjacent to the inner surface and a thicker layer of rubber substantially free of fabric at the outer surface, said method including applying uncured rubber to the tire section to be repaired, applying to the outer surface of the tire at said repair section a layer of material having substantially the same dielectric constant as the fabric incorporated in the inner portion of the tire wall, clamping the tire wall and said material between a pair of electrodes, said electrodes being spaced from said tire wall and said material by deformable pads, and producing a high frequency electrostatic field between said electrodes.

4. The method of repairing a tire by vulcanizing uncured rubber at the area of the wall to be repaired, which includes clamping between an electrode carrier and the tire wall a strand of a material having high tensile strength at atmospheric temperature and low tensile strength at the temperature at which the uncured rubber becomes vulcanized, applying sufficient tension to said strand to break the latter when it is heated to the temperature required for vulcanizing the uncured rubber, producing an electrostatic field including the area to be vulcanized, and by a high frequency electric current, and breaking the circuit of said current upon the breaking of said strand.

5. The method of repairing a tire by vulcanizing uncured rubber at the area of the wall to be repaired, including clamping across the area to be vulcanized a strand of a material having high tensile strength at atmospheric temperature and low tensile strength at high temperature, producing an electrostatic field including the area to be vulcanized, putting the strand under tension, and terminating the production of said field when said strand breaks upon being heated to the temperature at which the vulcanization of the uncured rubber has been effected.

6. An apparatus for repairing tires by the vulcanization of uncured rubber at the area to be repaired, including a non-metallic strand of a material having high tensile strength at atmospheric temperature and low tensile strength at high temperature, means for clamping a portion of the strand across the area to be vulcanized, means for putting said strand under tension, means for producing an electrostatic field in the area of the uncured rubber, and means for terminating the production of said field in response to the breaking of said strand.

7. An apparatus for repairing tires, including a pair of electrodes, a pair of deformable pads, means for clamping the tire wall between said pads and said pads and wall between said electrodes, means for producing an electrostatic field between said electrodes, a non-metallic strand disposed between one electrode and the tire wall, means for putting said strand under tension, and means for terminating the production of said field in response to the breaking of the strand.

8. An apparatus for repairing tires, including a pair of electrodes adapted to be positioned with the tire area to be repaired therebetween, a non-metallic strand of a material having high tensile strength at atmospheric temperature and low tensile strength at high temperature, means for putting said strand under tension with a portion of it clamped in juxtaposition to the area to be repaired, means for putting said strand under tension, and means for terminating the production of the electrostatic field in response to the breaking of the strand.

9. A device for holding a strand across an area of a tire to be vulcanized, and including a part having pins adapted to be inserted in the tire wall to hold the device in place, and said device having a tube through which a strand may extend to and over the area to be vulcanized.

10. In combination, an electrode carrier, a deformable pad adapted to be pressed against the tire wall over the area to be vulcanized, and between said electrode carrier and the tire, a protecting device for holding a strand in place over the area to be vulcanized and preventing the application of pressure to an outwardly extending portion of said strand, and thereby forming a groove in the wall of said pad during the application of pressure to said pad, whereby upon removing said device a portion of the strand is loosely held in said groove of said pad.

11. An apparatus for repairing tires by vulcanizing uncured rubber at the area to be repaired, including a deformable pad having a flexible wall, a pair of electrodes, means for compressing said pad and the tire between said electrodes, a non-metallic strand having high tensile strength at atmospheric temperature and low tensile strength at the temperature required for vulcanizing, and having a portion disposed between said pad and said tire wall, means for placing said strand under tension, means for producing a high frequency electrostatic field between said electrodes, means for applying to said strand sufficient tension to break the strand when it reaches the temperature required for the desired vulcanization, and means for breaking the circuit to said electrodes, said means being held inoperative by said strand during the vulcanization.

EINO E. LAKSO.

REFERENCES CITED

The following references are of record in the file of this patent:

UNITED STATES PATENTS

| Number | Name | Date |
|---|---|---|
| 719,946 | Loffler | Feb. 3, 1903 |
| 1,246,471 | Rumpf | Nov. 13, 1917 |
| 2,280,771 | Dufour et al. | Apr. 28, 1942 |
| 2,075,486 | Van Dyke | Mar. 30, 1937 |
| 1,911,894 | Heintz | May 30, 1933 |
| 2,340,692 | Ridd | Feb. 1, 1944 |
| 2,324,068 | Crandell | July 13, 1943 |
| 2,341,617 | Hull | Feb. 15, 1944 |